United States Patent [19]

Mattson

[11] 4,287,882

[45] * Sep. 8, 1981

[54] BLACK LIQUID ABSORBING SOLAR COLLECTOR

[75] Inventor: John P. Mattson, Ducksberry, Mass.

[73] Assignee: Solarspan, Inc., Duxbury, Mass.

[*] Notice: The portion of the term of this patent subsequent to Jul. 1, 1997, has been disclaimed.

[21] Appl. No.: 51,617

[22] Filed: Jun. 25, 1979

Related U.S. Application Data

[63] Continuation-in-part of Ser. No. 938,026, Aug. 30, 1978, Pat. No. 4,210,128.

[51] Int. Cl.³ .......................... F24J 3/02; F28F 27/02
[52] U.S. Cl. ................................... 126/445; 126/449; 126/450; 126/900; 165/97
[58] Field of Search .............. 126/444, 446, 449, 450, 126/445, 900, 901; 165/81, 82, 83, 97

[56] References Cited

U.S. PATENT DOCUMENTS

| | | | |
|---|---|---|---|
| 4,069,809 | 1/1978 | Strand | 126/449 |
| 4,129,117 | 12/1978 | Harvey | 126/449 |
| 4,210,128 | 7/1980 | Mattson | 126/446 |

Primary Examiner—Daniel J. O'Connor
Attorney, Agent, or Firm—Edward A. Gordon

[57] ABSTRACT

A solar energy collector wherein the absorber means comprises a black liquid absorber for converting solar energy to thermal energy and absorbing the thermal energy. The solar energy collector includes an upper cover having a plurality of raised chamber modules each having surfaces angularly disposed to the cover surface for collecting and transmitting solar energy to the black liquid absorber. Center plate means are provided for exposing the black liquid absorber to solar radiation and comprise a floating member having an upper and lower surface means transparent to solar energy and defining a plurality of upper and lower elongated channel means for circulating the black liquid absorber there within to provide a flow-return flow of the black liquid absorber thereby providing additional exposure to solar radiation. Inlet conduit means are provided for introducing the black liquid absorber to the upper channel means and outlet conduit means are provided in the lower channel means for conveying away the black liquid absorber and absorbed thermal energy after circulation through the upper and lower channel means. The inlet and outlet conduit means are each located at the lower end of the collector. A lower cover means is provided having a plurality of raised chamber modules each having surfaces angularly disposed to the cover surface, transparent to solar radiation, and corresponding to the upper means. The upper and lower cover means are disposed in abutting relationship, respectively, along their perimeters whereby the center means is held in floating relationship therebetween. In the preferred embodiment, upper and lower wall means are removable and are disposed within the upper and lower cover means and elongated channel center means. The upper and lower wall means are transparent to solar radiation and have a configuration and are positioned relative to the channel means so that when the collector is exposed to solar radiation, will provide for mechanical rigidity of the collector and minimize heat loss by conduction, convection and radiation.

8 Claims, 8 Drawing Figures

BLACK LIQUID ABSORBING SOLAR COLLECTOR

This application is a continuation-in-part of my copending application Ser. No. 938,026 filed Aug. 30, 1978 and entitled: Black liquid Absorbing Solar Collector, now U.S. Pat. No. 4,210,128.

BACKGROUND OF THE INVENTION (1) Field of the Invention

This invention relates to solar energy collectors and, more particularly, to a black liquid absorbing collector.

(2) Description of the Prior Art

Various solar collectors have been suggested for use in conjunction with a black liquid solar energy absorber. In some prior systems the use of a black liquid absorber is mentioned in connection with the black metallic solar energy absorbing surface. *PERFORMANCE ANALYSIS OF A BLACK LIQUID ABSORBING COLLECTOR*, Proceedings of the 1977 Annual Meeting of the ASISES, Volume 1, Section 1-13, describes a black liquid absorber which flows between two transparent sheets of glass in a flat glass sandwichlike collector assembly.

The use of a black metallic surface in conjunction with a black absorbing liquid has the disadvantage in that the collector is continually affected by solar energy and cannot be turned off when not in use.

The use of a black liquid absorber in rigid flat sandwichlike assembly has the disadvantages in that they are formed of materials such as glass and metal and require seals and gaskets for assembly of the collector which results in uncreased cost and weight. Additionally, such solar collectors do not provide for maximum solar energy absorption per given unit area or provided for minimizing heat loss. While such flat collectors can be installed on an existing building with a flat roof, they are not readily adaptable to existing structures having inclined roofs and are particularly not suitable for inclined roofs which run other than in a generally east-west direction.

SUMMARY OF THE INVENTION

The invention makes possible a highly efficient solar to thermal energy conversion by providing for an improved black liquid absorbing collector which maximizes solar energy absorption while minimizing heat loss such as by conduction, convection and radiation. The invention also makes possible a solar energy collector which will not be affected by the sun when not in use.

In general, the black liquid absorbing collector may comprise between 3 to 5 component members comprising upper and lower covers with at least the upper cover having a plurality of raised heat chamber modules each having surfaces angularly disposed to the cover surface and transparent to solar energy. Disposed between the upper and lower covers is a centerplate means for exposing a black solar energy to thermal energy conversion absorbing fluid. By the term "black liquid absorber" as used herein it is meant a liquid or fluid which has a blackening agent dispersed therein, including an agent for dyeing the liquid black, whereby the liquid so blackened when exposed to solar energy converts to thermal energy and absorbs the thermal energy. The centerplate means comprises a plurality of upper and lower elongated channel means. At the lower end of the centerplate inlet and outlet means are provided. The inlet means communicates with the upper elongated channel means by an upper manifold for introducing and distributing the black liquid absorber to the upper elongated channel means. The outlet means communicates with the lower elongated channel means by a manifold means for collecting and conveying away the black liquid absorber. At the upper end of the centerplate the upper and lower elongated channel means communicates with each other whereby the black liquid absorber is conveyed up the upper channels, cascades down to the lower elongated channels and flows down to the lower end of the outlet means. The lower elongated channels are offset from the upper elongated channels so that during the return flow the black liquid absorber will receive additional thermal energy by further exposure to solar radiation throughout the area between each upper elongated channels. The centerplate is supported within the collector so that it can float, that is, expand or contract due to thermal or fluid changes without effecting other member elements of the collector.

Disposed within the cover means and about the centerplate means are upper and lower wall means having at least the upper wall transparent to solar radiation and having a configuration and being positioned relative to said black liquid exposing means so that (1) when said collector is exposed to solar radiation will provide for mechanical rigidity of the collector, (2) will reduce heat loss by conduction, convection and radiation. The component members of the collector are vacuum-formed from a plastic material to provide a lightweight sturdy collector unit.

In operation, when the solar collector of the present invention is connected to a solar collector system comprising, for example, a source or holding tank of black liquid absorber fluid, a pump means for pumping the black liquid absorber fluid, thermal energy exchange means, and a thermal energy storage tank means, the black liquid absorber is pumped through the inlet manifold and up the plurality of upper elongated channel means and is exposed to solar radiation whereby it converts the solar energy to thermal energy, then cascades down to the lower elongated channel means where it is further exposed to solar radiation during its return flow to the outlet manifold and then is conveyed away to the heat exchange means where thermal energy is removed and stored in a thermal energy storage tank, the black liquid absorber being recycled back to the solar collector for further heating.

In preferred embodiments, when temperature of the storage tank reaches a desired level, a thermal sensor, for example, will shut down the black liquid absorber pump and, because the system is not pressurized, permit the black liquid absorber to automatically drain into the holding tank whereby the collector will not be affected by solar radiation and no further heating will take place. The collector may remain empty, or another colored liquid may be selectively pumped into the collector from a storage system containing a plurality of different colored liquids. Plant growth could be enhanced, for example, by filling the collectors during the non-heating period with a magenta colored liquid. In the empty condition, or by filling the collectors with a clear or colored liquid would permit the collectors to serve as skylights. When further heating is desired, or when a predetermined temperature is reached, the colored liquid would be returned to the storage tank and circulation of the black liquid absorber resumed.

In some preferred embodiments of the invention, the upper cover of the solar collector is molded or formed as one integral sheet having a plurality of raised multifaced prismatic-like structures which collect and transmit solar radiation to the black liquid absorber fluid and form heat chambers which serve to minimize heat loss. The raised multifaced prismatic-like structures will be referred to hereinafter as prisms, or heat chambers, for simplicity of discussion and is not used in a limiting sense. The prisms, or heat chambers, may have a variety of shapes and configurations for reasons which will be explained in greater detail hereinafter. The faces of the prisms are so arranged and constructed with respect to angle and direction for a given latitude of the earth's surface to provide for optimum transmission of incident solar radiation. Since the angle of maximum insulation varies from summer to winter due to the axis of the earth's rotation being tilted or inclined to the axis of its path around the sun by $23\frac{1}{2}°$, prisms with the proper configuration of angle and direction are provided to produce optimum collectors of incident solar radiation. The surfaces of the prisms also serve to collect incident solar radiations, which would normally be lost by reflection, by multiple reflections from adjacent prism surfaces and directing them to the energy or heat absorbing black liquid.

As mentioned above, the tilting of the earth has the result that, with reference to the North Pole, the axis tilts toward the sun on June 21, the Summer Solstice, and away from it on December 21, the Winter Solstice. The effect of the inclination of the axis of rotation on the angle of incidence of the sun rays is that on June 21 the sun's rays are perpendicular to the earth's surface at latitude $23\frac{1}{2}°$ North. On December 21, the situation is reversed and the sun's rays are perpendicular to the earth a latitude $23\frac{1}{2}°$ South. Thus it can be seen that at 45° N. latitude, for example, the sun's maximum height above the horizon at local noon is $21\frac{1}{2}°$ on December 21, and $69\frac{1}{2}°$ on June 21. Thus the angle for optimum intensity of solar radiation varies with seasonal changes.

In some preferred embodiments of the invention the collector is constructed so that configuration, direction and angle of surfaces of certain prisms are optimum for the Winter Solstice of the sun and the configuration, direction and angle of surfaces of certain other prisms are optimum for the Summer Solstice of the sun. It is understood that the east to west movement of the sun resulting from the earth's rotation is accommodated for by the directions of the principal prism surfaces.

In some preferred embodiments, the collector is provided with a plurality or series of prisms, each of which series are designed to provide optimum collection of incident solar radiation over a particular angular movement of the sun with respect to the local position of the collector. As the sun changes its angular relationship, another series of prisms will collect the optimum incident solar radiation. The different prisms may be arranged in tiers, series, parallel, or or combinations thereof, for example, to achieve maximum collection. Thus the solar collector of the present invention provides for fixed tracking of the sun during the east to west travel and during the seasonal variations.

In some preferred embodiments of the invention the bottom cover of the collector is similar to the top cover in configuration and material to provide a dual sided collector. The bottom cover is then inverted and attached to the upper cover with the means for exposing the black liquid absorber fluid disposed therebetween as will be explained in greater detail hereinafter.

Many of the above described features of the invention may be utilized independently of some of the others, but they are preferrably combined into one embodiment which is highly efficient in converting solar energy to heat energy.

The invention accordingly comprises the apparatus possessing the construction, combination of elements and arrangement of parts which are exemplified in this disclosure and the scope and application of which will be indicated in the claims.

DESCRIPTION OF THE PREFERRED EMBODIMENT(S)

For a fuller understanding of the nature and desired objects of the invention, reference should be had to the following detailed description taken in connection with the accompanying drawing wherein like reference characters denote corresponding parts throughout the several views and wherein.

Figure 1:
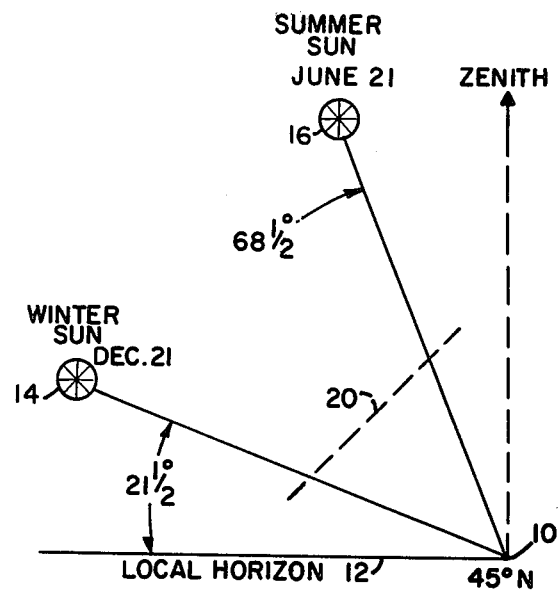
FIG. 1 is a schematic representation of the angle of incidence of solar energy as a function of the annual variation from winter to summer at 45° N. Latitude.

Referring now more particularly to FIG. 1, there is illustrated the effect on incident solar radiation from the tilting of the earth on its axis of rotation. As mentioned previously, on June 21, the summer solstice, the sun's rays are perpendicular to the earth's surface at latitude $23\frac{1}{2}°$ North, and on December 21 the sun's rays are perpendicular to the earth at latitude $23\frac{1}{2}°$ South. At 45° N. latitude, as shown at 10, the sun's maximum height above the local horizon 12 is $21\frac{1}{2}°$ on December 21, position 14, and $68\frac{1}{2}°$ on June 21, position 16. Thus it can be seen that angle for optimum intensity of solar radiation varies from winter sun to summer sun. Thus it can be understood that optimum collection of solar radiation would be obtained by tracking the sun's increment relative to the earth.

Figure 2:
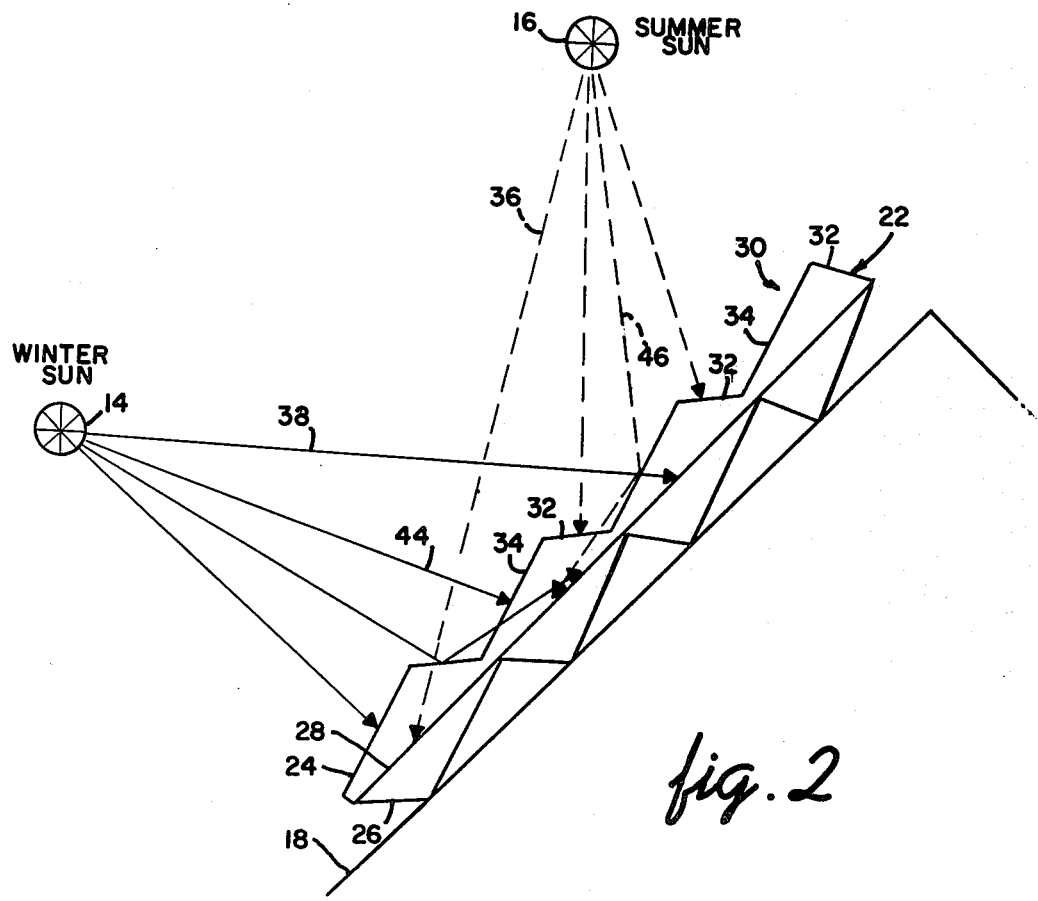
FIG. 2 is a schematic, diagrammatic sectional view of a solar energy tracking collector illustrating the tracking-collecting feature from summer sun to winter sun.
Figure 3:
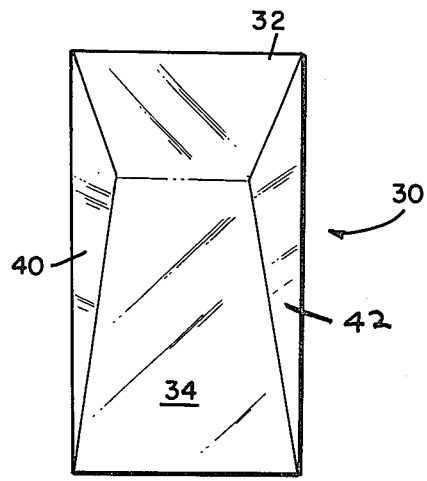
FIG. 3 is a top perspective view of a prism collector of FIG. 2.
Figure 4:
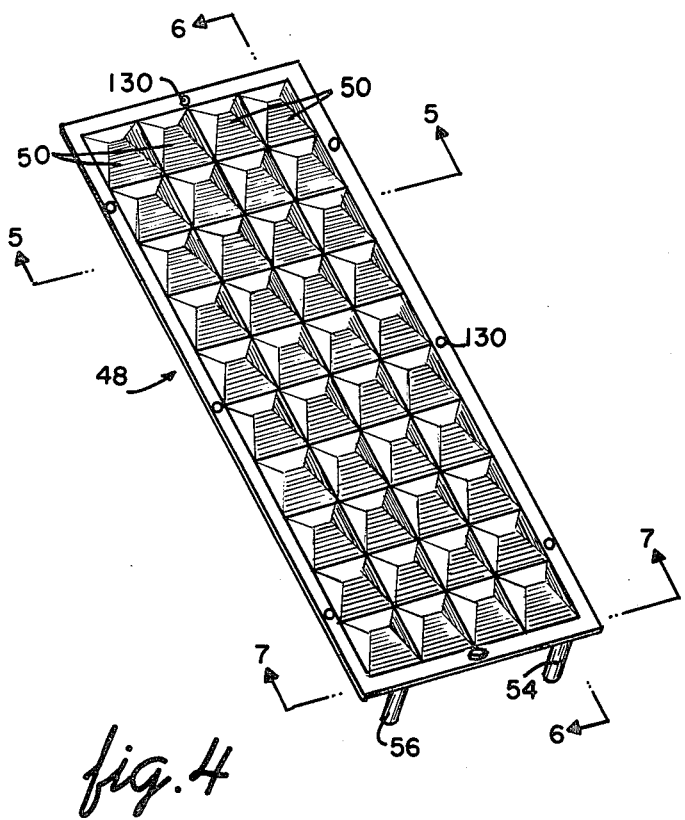
FIG. 4 is a perspective view of a solar energy collector embodying the invention.

Referring now to FIGS. 2 and 3, there is shown a roof represented by the line 18 having the same relative position as dotted line 20 of FIG. 1 with respect to the position of the winter sun 14 and summer sun 16. Positioned on roof 18 is a solar energy collector 22 having a cover 24, and a base 26 and an energy receiving means 28 and being more particularly constructed as described with respect to embodiment of FIG. 4. The collector 22 is provided with a plurality of prisms 30 having surfaces 32 whose angle with respect to the energy receiving means 28 is optimum for the summer solstice position of the sun 16 as shown by solar radiation 36, and surfaces 34 whose angle with respect to the energy receiving means 28 is optimum for the winter solstice position of sun 14 as shown by solar radiation 38. Surfaces 40 and 42 also provide for collection of the solar radiation as the sun moves laterally relative to the earth's rotation. By the term "collection" as used herein it is meant collection by direct incidence and by reflection as illustrated by rays 44 and 46. Thus it can be seen that the solar collector of the present invention can be provided with a plurality of prisms having surfaces which are pre-arranged to provide optimum collection of incident solar radiation over a particular angular movement of the sun relative to local position on earth of the solar collector.

Referring now to FIGS. 4, 5, 6 and 7, there is illustrated a solar energy collector system shown generally at 48 comprising four solar energy collector tiers 50 a centerplate means shown generally at 52. The centerplate 52 is provided with an inlet means 54 and manifold means 54a for introducing a black liquid absorber fluid to the centerplate 52 for exposing a black liquid absorber to solar radiation and outlet means 56 and manifold means 56a for conveying the black liquid absorber and absorbed thermal energy away from the centerplate 52. Each solar collector is provided with an upper cover 60 which is molded or formed as one integral structure having a series of raised multifaced prism heat chambers 62 formed by prisms 30 which collect and transmit solar radiation to the black liquid absorber carried by the centerplate solar radiation exposing means 52. The lower cover or base 64 is molded or formed in the same manner and configuration as upper cover 60 and is inverted to serve as the lower cover or base 64. Lower cover 64 may be used to collect and transmit solar radiation to the black liquid absorber in the same manner as upper cover 60 and thus provides a dual-sided solar energy collector. When lower cover 64 serves as the base of the collector, it may be provided with a heat-reflective coating 66 which serves to minimize heat loss from the black liquid absorber. Additionally, the lower cover 64, when serving as the base, may be filled with as suitable insulating material, for example, styrofoam (not shown), to further minimize heat loss when retro-fitting.

The centerplate means 52 for conveying and exposing the black liquid absorber to solar radiation comprises an upper surface 68 which defines a plurality of upper elongated channels 70 and a lower surface 72 which defines a plurality of lower channels 74. The upper and lower channels 70, 74 are separated by a center member 58 along their length to the opening 76 which provides communication between the upper channels 70 and the lower channels 74 along width of center member 58. The black liquid absorber is conveyed along the upper channels 70 then cascades over lip 78 of center member 58 and flows back through lower channels 74 (as shown by arrows of FIG. 6). The upper and lower channels 70 and 74 are offset to provide an offset area 79 whereby the black liquid absorber flowing through the opposing adjacent channel may receive additional exposure to solar radiation.

Disposed within the upper and lower cover means 60 and 64 and about the centerplate means 52 for exposing the black liquid absorber to solar radiation are upper and lower wall support means 80 and 82 which are transparent to solar energy. The upper and lower wall means 80 and 82 are provided with a serrated, saw-tooth, or corrugated configuration. While the upper and lower wall support means 80 and 82 preferably have a saw-tooth configuration, they may be formed as sheet members. The upper and lower wall means 80, 82 are preferably positioned adjacent to the upper and lower channel surface means 68 and 72 so that the elongated saw-tooth configuration is transverse to the elongated upper and lower channels 70, 74 whereby, (1) when said collector is exposed to solar radiation will provide for mechanical rigidity of the collector; (2) reduce heat loss by conduction, convection and radiation; (3) control thermal expansion of the black liquid absorber exposing means 54; and, (4) control the maximum volume of black liquid absorber fluid per unit area carried by the elongated channel means 70, 74 for exposing the black liquid absorber to solar radiation.

The spaces 84 and 86 tend to minimize heat loss by conduction and convection while the angular configuration of the upper and lower walls 80 and 82 tend to minimize heat loss by radiation due to multiple reflections back to the black liquid absorber.

Figure 5:
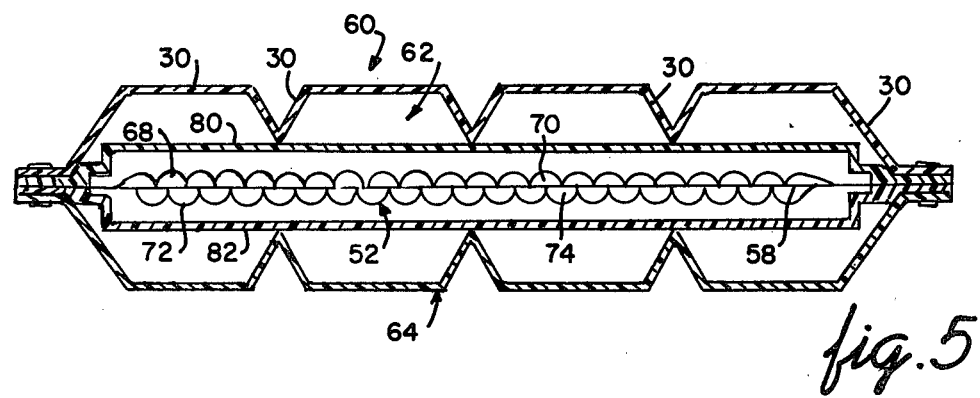
FIG. 5 is a fragmentary sectional view taken along the lines 5—5 in FIG. 4.
Figure 7:
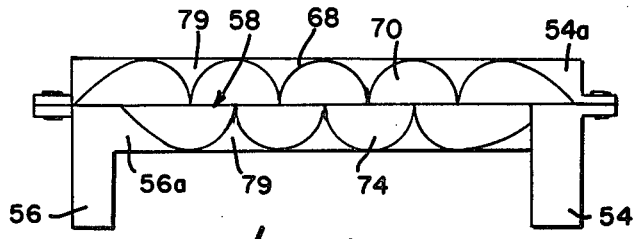
FIG. 7 is a sectional view taken along the lines 7—7 in FIG. 4 for the purpose of illustrating in schematic fashion the inlet, outlet and associated manifold means of the centerplate only for exposing the black liquid absorber.
Figure 6:
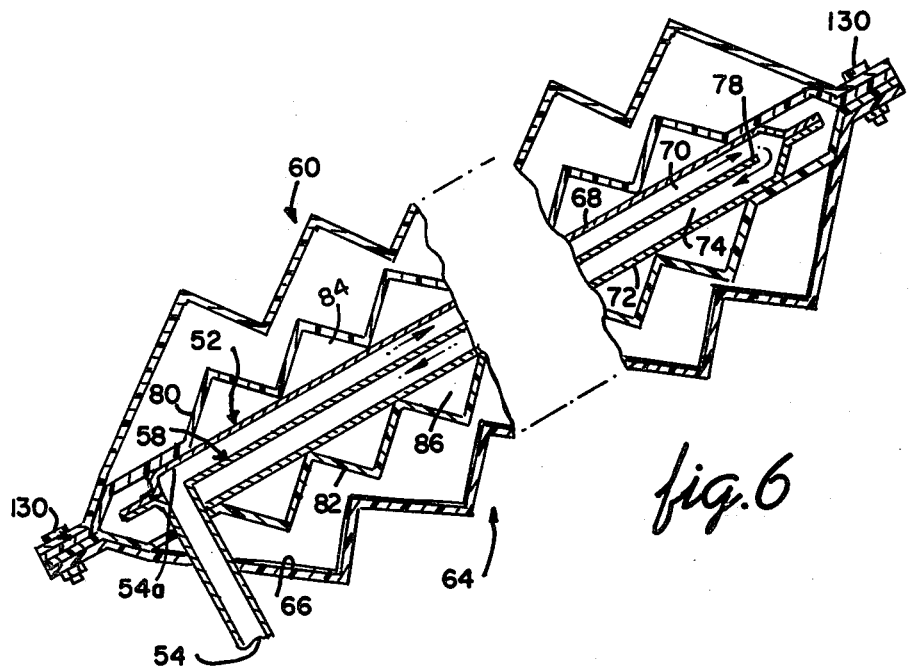
FIG. 6 is a fragmentary sectional view taken along the lines 6—6 in FIG. 4.
Figure 8:
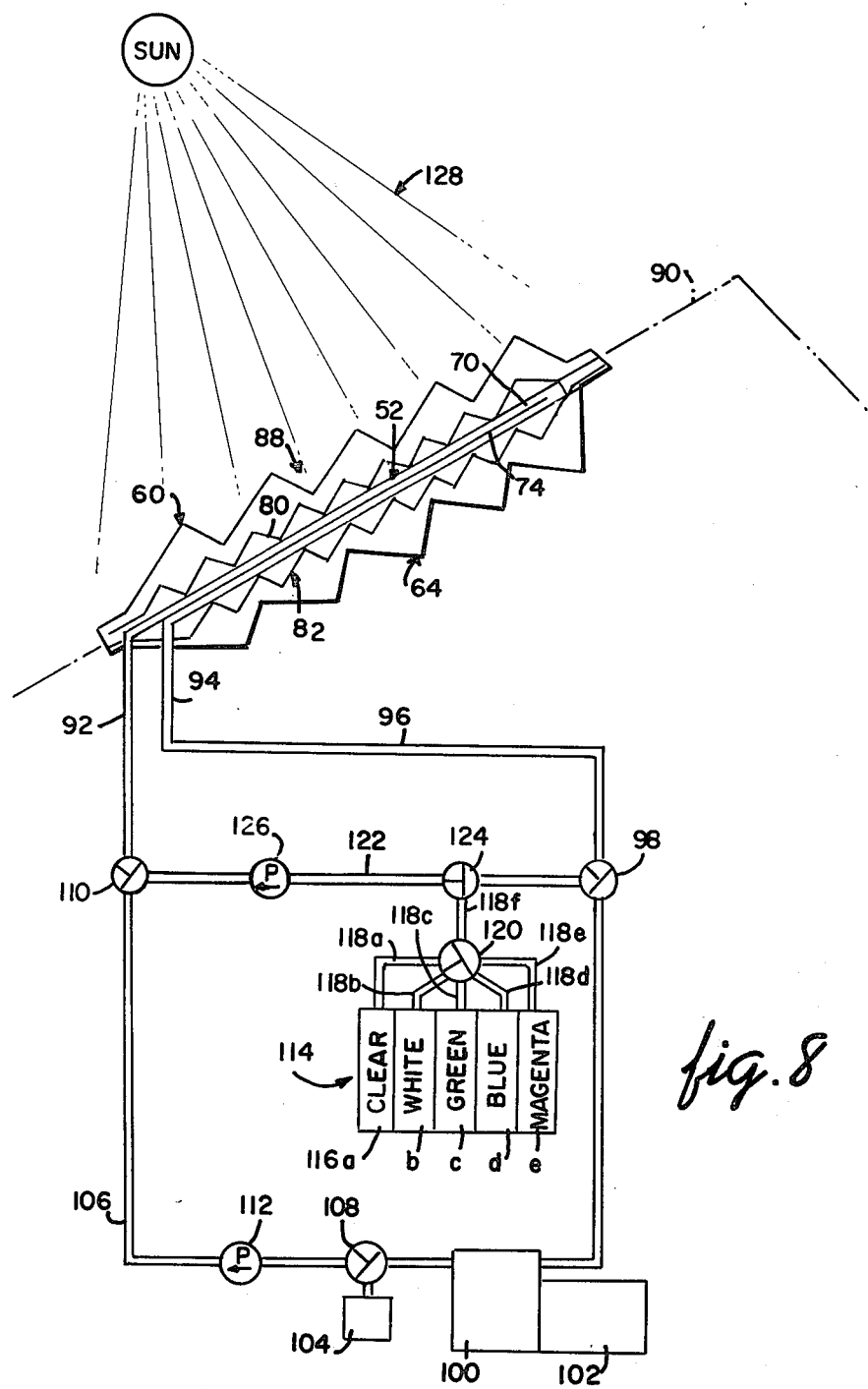
FIG. 8 is a diagrammatic, schematic, partially sectional view of one embodiment of the invention as applied to a solar energy system for a building.

Referring now to FIG. 8, there is illustrated one embodiment of the present invention as applied to a solar energy system for a building wherein a solar energy collector provided at 88 is constructed in accordance with the present invention as described with reference to FIGS. 5, 6, 7 and forms part of the roof of a building indicated by the dotted line 90. The term "collector" as used herein is intended to include one or more series of collectors connected by suitable inlet and outlet manifold means 92, 94 to introduce and remove the black liquid absorber as described hereinbefore. The solar collector 88 is connected by conduit means 96 and valve means 98 to suitable heat storage tank 100. The heat storage tank 100 is connected to a suitable solar heat exchanger 102. A reservoir or holding tank for the black liquid absorber is provided at 104 and is connected to the inlet end of the solar collector 88 by conduit 106 containing valve means 108 and 110 and pump means 112. A container 114 having a plurality of colored liquid containing compartments 116a,b,c,d and e is connected by suitable conduits means 118a,b,c,d,e, and f to selector valve 120 which is connected to conduit 122 containing valve means 124 and pump means 126. In operation for heating, valves 110 and 98 are turned to close off conduit 122 from conduits 106 and 96 and connect the solar collector 88, heat storage tank 100, black liquid absorber reservoir 104 and pump 112 in series. Black liquid absorber from reservoir 104 is pumped by pump means 112 to the solar collector 88 via conduit means 106 and inlet means 92 where it is exposed to solar radiation 128 and heated as it is pumped up the upper elongated channel means 70 and further heated as it flows back by lower elongated channel means 74, then flows via outlet means 94 and conduit means 96 to the solar heat storage tank 100 where the heat is removed by heat exchanger means 102, and the black liquid absorber is recycled. When a predetermined or desired amount of heat is stored, or temperature reached by the heat storage tank 100, the pump 112 is turned off and the black liquid absorber is allowed to drain from the system via the solar collector 88, valve 110, conduit 106 and valve 112 to reservoir 104. In this manner, the collector is emptied of the black liquid absorber and is no longer heated by the solar radiation 128 and thus may serve as a skylight. The solar collector 88 may remain empty, or a colored liquid may be pumped into the collector 88 from the container 114 as follows: valves 110 and 98 are turned to connect conduit 122 with the solar collector 88. Selection valve 120 is turned to connect the pump 126 and the selected color liquid pumped into the collector to provide the desired aesthetic effect. When further heating is desired, the colored liquid is drained and the black liquid absorber recycled. It is understood that the circulation of the black liquid absorber may be partially or fully automatic by use of heat sensing devises and hardware well known to those skilled in the art.

The solar energy collector of the present invention is preferably formed of a lightweight, high temperature resistant high strength, clear plastic material which will transmit solar radiation and which is capable of being vacuum-formed into the desired configurations. One suitable material is a clear cellulose acetate butyrate material sold under the tradename UVEX. A thickness on the order of 0.04 to 0.10 inch is suitable for forming the collector components, although greater thicknesses can be employed.

A suitable black liquid absorber may consist of a fluid such as water with a blackening agent such as carbon black dispersed therein. Other suitable fluids and blackening agents may be used such as commercial antifreeze solutions with a suitable dyeing agent well known to those skilled in the art. The main requirements being that the black liquid absorber have a low vapor pressure, be capable of being easily pumped, and have a sufficient concentration of blackening agent to maximize absorption of solar energy and a suitable low freezing point consistent with the ambient temperature at the place of use.

Additionally, when the collector is not employed as a dualsided collector or skylight, heat reflective means such as heat reflective coating may be provided on the inner surfaces of the lower wall means 82 as described above with respect to lower cover 64 and reflective coating 66.

In assembling the vacuum-formed components of the solar energy collector of the present invention (references being made to the drawing and in particular FIG. 8) the lower cover 64 can be placed on the roof of a house to form part of the roof in new construction, or upon the roof of an existing house with suitable retrofit installations.

The lower wall support 82 is then placed on the lower cover 64. The centerplate 52 is then inserted and the upper wall support 80 is placed above. The upper cover 60 is then placed on top to complete the unit. The Covers 60, 64 and wall supports 80, 82 are preferably removably fastened together about their periphery with suitable fasteners 130 to facilitate assembly and disassembly of the collector 88. The centerplate 52 is not fastened but is allowed to float, that is, to move with expansion or contraction within the collector unit 48. In tropical climates, for example, the upper wall support 80, may be omitted where minimizing heat loss is less critical due to high ambient temperatures. In the same manner the lower wall support 82 may be removed although this embodiment is less preferred.

Since certain changes may be made in the above apparatus without departing from the scope of the invention herein involved, it is intended that all matter contained in the above description or shown in the accompanying drawing shall be interpreted as illustrative, and not in a limiting sense.

What is claimed is:

1. A solar energy collector wherein the absorber means comprises a black liquid absorber for converting solar energy to thermal energy and absorbing said thermal energy, comprising an upper cover means having a base and a plurality of raised chamber modules having surfaces angularly disposed to said cover base for collecting and transmitting solar energy to said black liquid absorber, means for exposing said black liquid absorber to solar radiation comprising upper and lower conduit means transparent to solar radiation, said upper and lower conduit means communicating at one end of said black liquid exposing means, inlet and outlet means disposed at the other end of said black liquid exposing means, said inlet means communicating with said upper conduit means and said outlet means communicating with said lower conduit means, a lower cover means having a base and a plurality of raised chamber modules having surfaces angularly disposed to said cover base and corresponding to said upper cover, said upper and lower cover being disposed about said black liquid absorber exposing means whereby said chamber modules form a plurality of heat chambers for maximizing solar energy collection and minimizing heat loss.

2. The solar energy collector of claim 1 wherein said upper and lower conduit means comprise a plurality of elongated channel means.

3. The solar energy collector of claim 1 wherein said lower cover means is provided with means for reflecting heat to said black liquid absorber.

4. A solar energy collector of claim 1 further comprising means for interrupting circulation of said black liquid absorber through said solar energy collector whereby said solar energy collector does not convert solar energy to thermal energy and for recirculating said black liquid absorber to resume conversion of solar energy to thermal energy.

5. A solar energy collector of claim 4 providing means for selecting and introducing a colored fluid to said solar collector during said period of time when circulation of said black liquid absorber is interrupted, means providing a plurality of said colored fluids selected from the group consisting of colored and colorless, and means for removing said fluid from said solar collector.

6. The solar energy collector is defined in claim 1 wherein said collector is formed from a plastic material transparent to solar radiation.

7. A solar energy collector comprising an upper and lower cover means wherein at least the upper cover means is transparent to solar radiation, means disposed between said upper and lower cover means for exposing a black liquid absorber to solar radiation to convert solar energy to thermal energy comprising upper and lower conduit means having at least the upper conduit means transparent to solar radiation, said upper and lower conduit means communicating at one end of said black liquid exposing means, inlet and outlet means, disposed at the other end of said black liquid exposing means, said inlet means communicating with said upper conduit means for introducing a black liquid absorber to said black liquid exposing means, said outlet means communicating with said lower conduit means for conveying away said black liquid absorber after exposure to solar radiation, upper and lower wall means disposed within said cover means and about said black liquid exposing means and wherein at least the upper wall means is transparent to solar radiation, said wall means having the configuration and being positioned relative to said black liquid exposing means whereby when said collector is exposed to solar radiation will provide for mechanical rigidity of said collector and minimize heat loss by conduction, convection and radiation.

8. The solar energy collector as defined in claim 7 wherein said upper and lower conduit means define a plurality of side-by-side elongated channels and said upper and lower wall means have an elongated sawtooth configuration, each said wall means and adjacent channel means being located in longitudinally transverse relationship to each other.

* * * * *